United States Patent [19]

Huret, deceased et al.

[11] Patent Number: 4,470,824
[45] Date of Patent: Sep. 11, 1984

[54] DRIVE PULLEY, IN PARTICULAR FOR THE DISTANCE RECORDER OF A CYCLE OR MOTOR-CYCLE

[75] Inventors: Roger Huret, deceased, late of Nanterre, France; by Alain Pierre Bernard Huret, legal representative, Bougival, France

[73] Assignee: Huret et ses Fils, Nanterre, France

[21] Appl. No.: 356,038

[22] Filed: Mar. 8, 1982

[30] Foreign Application Priority Data

Mar. 23, 1981 [FR] France ................................ 81 05717

[51] Int. Cl.³ ...................... F16H 55/40; F16H 55/36; A47B 91/00
[52] U.S. Cl. .................................. 474/195; 474/174; 474/273; 248/359
[58] Field of Search ............... 474/166, 174, 195, 273; 280/289 R, 289 D; 73/527–529; 248/260, 205.1, 359

[56] References Cited

U.S. PATENT DOCUMENTS 4,006,877  2/1977  Van Niel .............................. 248/359
4,252,029  2/1981  Huret ................................... 474/174

Primary Examiner—John E. Murtagh
Assistant Examiner—Andrew Joseph Rudy
Attorney, Agent, or Firm—Trexler, Bushnell & Wolters, Ltd.

[57] ABSTRACT

The pulley of moulded plastics material is mounted adjacent to the outer side of the bicycle wheel flange, concentrically with this flange. The pulley comprises a grooved ring around which extends a belt for driving a distance recorder. From the periphery of the ring, on the side of the latter adjacent to the wheel flange, extend in generally radial directions are three arms which are angularly spaced 120° apart. Mounted on the free end portion of the arms by means of a pivot pin are the end portions of tabs which are provided with a mounting device at the opposite end. This mounting device is adapted to engage with a wheel spoke so as to maintain the pulley in a centered position relative to the wheel flange.

14 Claims, 4 Drawing Figures

DRIVE PULLEY, IN PARTICULAR FOR THE DISTANCE RECORDER OF A CYCLE OR MOTOR-CYCLE

DESCRIPTION

The present invention relates to a drive pulley, in particular for the odometer of a cycle or motor-cycle, adapted to be fixed in a position adjacent to a wheel hub flange and coaxially with said hub, and comprising a grooved ring on the periphery of which are formed three extensions each of which extensions has a free end portion provided with means for engaging the wheel.

In known drive pulleys of this type, which are as a rule of moulded plastics material, the three extensions formed on the periphery of the ring extend essentially axially and the three hooking nose portions provided at the free end of the respective extensions are adapted to be engaged with the circular edge of the corresponding hub flange whose diameter must consequently be the same as the diameter of the circle defined by the three axial extensions. When the two diameters are different, the pulley can only be mounted with the use of expedients which are hardly satisfactory.

It has already been proposed to construct rings forming a pulley and provided with a plurality of groups of three extensions which, in each group, correspond to a different flange diameter, the extensions other than the three extensions being used being then eliminated upon assembly, by means of a cutting tool. Apart from the fact that this results in a waste of material, this arrangement requires much attention on the part of the fitter who might make an irreparable mistake in the choice of the extensions to be conserved.

An object of the invention is to provide a drive pulley which is relatively simple to manufacture and yet permits a reliable adaptation to different flange diameters. In this pulley, each of the three extensions constitutes an arm which extends generally radially at the free end of which arm is carried, in an adjustable position, mounting means engageable with a spoke of the cycle or motor-cycle wheel.

For the purpose of fixing the pulley to a wheel having a normal spoke arrangement, ie. in which each spoke crosses three other spokes, it is sufficient for ensuring that the mounting be possible in all cases, to provide at the free end of each of the radial arms an aperture which defines at least one position for receiving a stud which extends through the aperture and is part of the mounting means, which is advantageously formed by a rotatable clip between the elastically yieldable branches of which clip a spoke of the wheel may be gripped.

If the wheel has a spoke arrangement other than the normal arrangement, a slightly different arrangement may be adopted, in which there is mounted to pivot about an axis parallel to the axis of the ring on the free end of the radial arm, one of the ends of a tab whose other end carries the mounting means which means may also be formed by a rotatable clip. A cheaper arrangement may be preferred to the rotary clip which resides in the provision, adjacent the end of the pivotal tab which is opposed to the pivot axis, an axial projection which is moulded with the tab and comprises at its periphery a slot in which a wheel spoke may be inserted. The projection is advantageously arranged in the form of a circular stud having a peripheral groove.

The invention will be explained merely by way of example in the ensuing description with reference to the accompanying drawing, in which.

Figure 1:
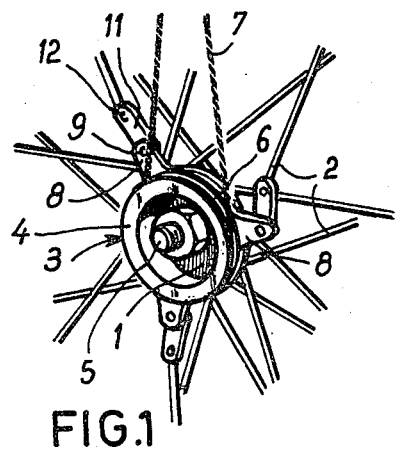
FIG. 1 is a diagrammatic perspective view of a bicycle wheel hub flange in the vicinity of which flange a drive pulley according to the invention is fixed by mounting means engaged with the spokes.

FIG. 1 shows a flange 1 of circular contour of a hub (not shown) surrounding a spindle 5 for mounting a bicycle wheel. Secured to the periphery of the flange in a conventional manner are one of the ends of a number of spokes 2. Mounted in a position adjacent to the outer side of the flange 1, and concentrically with the flange, is a pulley 3 of plastics material comprising a ring 4 in a groove 6 of which extends a belt 7 for driving a distance or kilometer recorder (not shown). Formed on the periphery of the ring 4 on the inner side thereof are three arms 8 having a generally radial orientation and angularly spaced apart 120°. Pivotally mounted on the free end portion 10 of each of the arms, by means of a pin 9, is one of the end portions of a tab 11 whose other end portion 12 is provided with a mounting means (not shown in FIG. 1) which are adapted to engage with a spoke 2 so as to maintain the pulley 3 in a central position relative to the flange.

Figure 2:
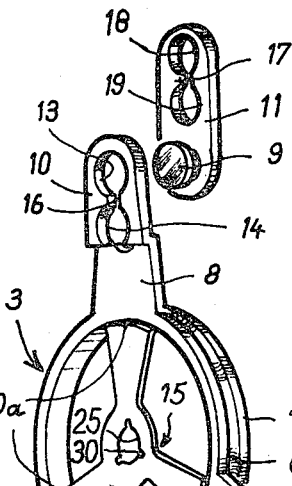
FIG. 2 is a perspective view, to an enlarged scale, of the pulley.

As shown in FIG. 2, the pin 9, which is in one piece with the tab 11, has an enlarged free end portion which may be engaged in a circular aperture 14 defined by a part of the inner contour of an opening 16 formed in the free end portion 10 of the corresponding arm 8. The contour of the opening 16 also defines another circular portion 13 whose diameter is smaller than the diameter of the aperture 14 and forms a cavity in which may be retained the pin 9 by an enlarged end portion of the latter, after having passed through, by an elastic deformation, a narrow passage in the opening 16 between the two circular apertures 13 and 14. Provided at the end of each pivotal tab 11 opposed to the pin 9 is an opening 17 defining two circular apertures 19, 18 for mounting in the aperture 18 a stud 21 which is previously inserted in the larger aperture 19. A rotatable clip 22 is integral with the stud 21 and has two branches 23 which are capable of being elastically spread apart and grip a spoke 2 in either of two positions defined by a step or toothed arrangement 24 formed in each of the branches 23 and constituting a constriction narrower than the diameter of the spoke.

The possibility of adjustment afforded by the pivoting of each tab 11, the rotatable mounting of each clip 22, and the step arrangement 24, enable the pulley according to the invention to be adapted to any diameter of the hub flange 1 and to the corresponding geometrical arrangement of the spokes of the wheel, each of which may cross any number of other spokes.

In order to center the pulley 3 with respect to the spindle 5, a web 15 in the form of a spider having three branches 20 is moulded with the inner edge of the inner opening of the ring 4. Formed in its centre portion is an aperture 25 whose edge is shaped in such manner as to be deformable and permits the insertion therein of the end portion of a spindle 5 of variable diameter, for example between 8 and 10 mm. In the illustrated embodiment, the edge portion of the aperture 25 is rendered deformable by radial notches 30. The arc 20a of connection with the edge of the ring 4 of each branch 20 of the spider is arranged as a region of lessened resistance so that the whole of the inner web 15 can be easily eliminated by means of a cutting tool when the assembly has been achieved.

Figure 3:
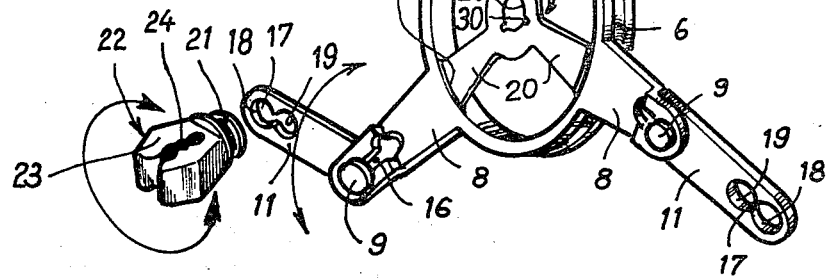
FIG. 3 is a view of a modification of the mounting means.

In the modification shown in FIG. 3, the clip 22 is replaced by a circular stud 26 which is integral with the tab 11 and has on its periphery a slot or groove 27 located in a plane parallel to the ring 4 and capable of being engaged with a spoke 2 by a pivoting of the tab 11.

Figure 4:
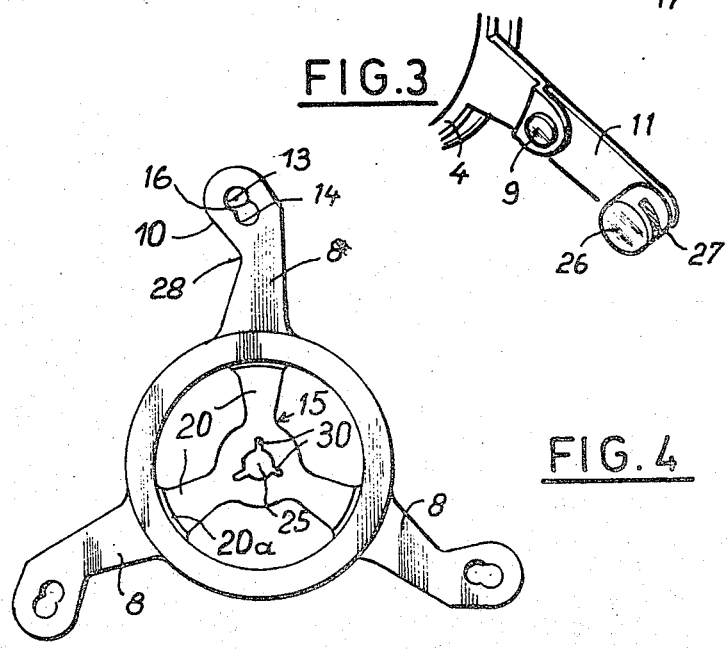
FIG. 4 is an elevational view of another embodiment of the pulley without the mounting means.

The embodiment shown in FIG. 4 corresponds to the case where the drive pulley must be mounted on a wheel having a normal spoke arrangement, ie. in which each spoke crosses only three other spokes. In this embodiment, there is no pivotal tab 11 and the stud 21 of each rotatable clip 22 is mounted in the aperture 13 of the end portion 11 of the corresponding radial arm 8, which end portion is bent at an obtuse angle, at 28, this stud 21 having been inserted first of all in the larger aperture 14.

Having now described my invention what I claim as new and desire to secure by Letters Patent is:

1. A drive pulley, in particular for an odometer of a cycle or motor-cycle, for fixing to a hub flange of a wheel having spokes and in a position adjacent to the flange and coaxial with the hub, the pulley comprising a grooved ring having an axis for coinciding with the axis of the wheel, three arms substantially radially extending from a periphery of the ring, each arm being rigidly fixed to the ring and having a free outer end portion, a mounting means carried in an adjustable position on the free end portion of each arm and capable of being engaged with a spoke of the wheel, each mounting means consisting of a clip mounted in the respective arm to rotate about an axis parallel to said axis of said grooved ring, said clip having spoke-engaging means consisting of two elastically yieldable branches defining a single substantially rectilinear slot which extends entirely in a direction substantially parallel to the axis of rotation of the clip and has an inner end and an entrance end for receiving the respective spoke in a direction substantially parallel to the axis of rotation of the clip and a construction which is located intermediate said ends of the slot and is narrower than the diameter of the spoke, whereby the three clips can be clipped onto the respective spokes merely by urging the three clips against the respective spokes in a direction parallel to said axis of said grooved ring.

2. A pulley according to claim 1, wherein the free outer end portion of each of the arms comprises an opening defining at least one circular aperture for the clip which extends through and is rotatably mounted in the aperture.

3. A drive pulley, in particular for an odometer of a cycle or motor-cycle, for fixing to a hub flange of a wheel having spokes and in a position adjacent to the flange and coaxial with the hub, the pulley comprising a grooved ring having an axis for coinciding with the axis of the wheel, three arms substantially radially extending from a periphery of the ring, each arm having a free outer end portion, a mounting means carried in an adjustable position on the free end portion of each arm and capable of being engaged with a spoke of the wheel, respective tabs for the arms, a pivot pin parallel to the axis of the ring for pivotally mounting on the end portion of each arm, an end portion of the respective tab having an opposite end portion which carries the mounting means.

4. A pulley according to claim 3, wherein each mounting means comprises a stud and said opposite end portion of the tab comprises an opening defining at least one circular aperture for receiving said stud which extends through the aperture.

5. A pulley according to claim 3 or 4, wherein each stud has an enlarged end portion and said opening comprises a circular part which is of larger diameter than said circular aperture, said enlarged end portion being insertable in said circular part of the opening.

6. A pulley according to claim 3 or 4, wherein said outer end portion of each arm comprises an opening defining at least one circular aperture and a circular part of larger diameter than said circular aperture, and each pivot pin has an enlarged end portion which is insertable in said circular part of said opening but is retained in said opening when the pivot pin is located in said circular aperture.

7. A pulley according to claim 3 or 4, wherein each mounting means comprises a rotatable clip having elastically yieldable branches between which branches a wheel spoke can be held.

8. A pulley according to claim 3, comprising, carried on said opposite end portion of each tab, an axially extending projection which has a slot, in which slot a wheel spoke is insertable.

9. A pulley according to claim 8, wherein said projection comprises a circular stud having a peripheral slot.

10. A pulley according to any one of the claims 1 to claim 3 or 4, comprising, in an inner opening defined by the ring, a centering web defining at the center of the web an aperture in which is insertable the end of a spindle on which the wheel hub is mounted.

11. A drive pulley, in particular for an odometer of a cycle or motor-cycle, for fixing to a hub flange of a wheel having spokes and in a position adjacent to the flange and coaxial with the hub, the pulley comprising a grooved ring having an axis for coinciding with the axis of the wheel, three arms substantially radially extending from a periphery of the ring, each arm having a free outer end portion, the free end portion of each of the arms comprising an opening defining at least one circular aperture and a circular part which is of larger diameter than said annular aperture and communicates with said circular aperture, and a stud for each arm and capable of being engaged with a spoke of the wheel and having an enlarged end portion which is insertable in said circular part of said opening and is rotatably mounted in said circular aperture.

12. A drive pulley, in particular for an odometer of a cycle or motor-cycle, for fixing to a hub flange of a wheel having spokes and in a position adjacent to the flange and coaxial with the hub, the pulley comprising a grooved ring having an axis for coinciding with the axis of the wheel, three arms substantially radially extending from a periphery of the ring, each arm having a free outer end portion, a mounting means carried in an adjustable position on the free end portion of each arm and capable of being engaged with a spoke of the wheel, and, in an inner opening defined by the ring, a centering web defining at the centre of the web an aperture in which is insertable the end of a spindle on which the wheel hub is mounted.

13. A pulley according to claim 12, wherein said aperture at the centre of the web has a deformable edge portion so as to enable it to receive an end of the spindle of variable diameter.

14. A pulley according to claim 12, wherein each mounting means comprises a stud, and the free outer end portion of each arm comprises an opening defining at least one circular aperture for the stud which extends through the opening.

* * * * *